US000001024H

United States Statutory Invention Registration [19]

[11] Reg. Number: H1024

Meister

[43] Published: Mar. 3, 1992

[54] THRUST VECTORING AND REVERSING NOZZLE

[75] Inventor: Peter C. Meister, Lake Park, Fla.

[73] Assignee: The United States of America as represented by the Secretary of the Air Force, Washington, D.C.

[21] Appl. No.: 589,821

[22] Filed: Sep. 26, 1990

[51] Int. Cl.[5] ..... F02K 1/00
[52] U.S. Cl. ..... 60/230; 239/265.29
[58] Field of Search ..... 60/228, 230, 232

[56] References Cited

U.S. PATENT DOCUMENTS

| | | | |
|---|---|---|---|
| H500 | 8/1988 | Stogner et al. | 239/265.25 |
| 2,960,822 | 10/1960 | Bertin | 60/35.54 |
| 3,739,582 | 6/1973 | Maison | 60/230 |
| 4,037,405 | 7/1977 | Huenniger et al. | 60/230 |
| 4,805,401 | 2/1989 | Thayer et al. | 60/226.2 |

*Primary Examiner*—Michael J. Carone
*Attorney, Agent, or Firm*—Donald J. Singer; Bobby D. Scearce

[57] ABSTRACT

A thrust vectoring and reversing exhaust nozzle structure for a gas turbine engine is described which comprises a rotatable flap mounted within the exhaust duct of the engine, and being rotatable about an axis of rotation extending transverse of the exhaust duct and substantially central of the flap, control means for rotating the flap between an open position allowing substantially unrestricted exhaust flow through the nozzle and a closed position substantially closing the exhaust duct, and a cascade of rotatable vanes in the engine housing structure operatively interconnected with the flap for rotation to an open position in response to rotation of the flap to the closed position.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THRUST VECTORING AND REVERSING NOZZLE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to exhaust nozzle structures for gas turbine engines, and more particularly to a thrust vectoring and reversing nozzle structure incorporating a single flap.

Use of thrust reversal devices in the nozzle discharge region of a gas turbine engine exhaust is well known. Thrust reversal may be used to selectively divert normally axially flowing, rearwardly directed exhaust gases from the engine in order to provide enhanced thrust vectoring, braking, in-flight maneuverability and lift for the aircraft and short take-off and landing capability. Conventional thrust reversal or vectoring structures normally take the form of a plurality of flaps pivotally mounted at the exhaust. A cascade of individually pivotable vanes adjacent the exhaust nozzle in the sidewalls defining the exhaust duct of the engine may be provided for cooperative action with the pivotable flaps and through which gaseous exhaust flow is diverted from the engine housing.

The invention provides a thrust reversal and vectoring nozzle structure utilizing a single rotatable flap across the discharge region of the nozzle. The flap may be selectively rotated to intermediate positions in order to controllably direct the exhaust stream in a vectoring function, or to a closed position to direct the exhaust flow through a cooperating cascade in a braking function.

It is a principal object of the invention to provide an improved exhaust nozzle structure for a gas turbine engine.

It is a further object of the invention to provide a thrust vectoring and reversing nozzle for a gas turbine engine.

It is yet a further object of the invention to provide a thrust vectoring and reversing nozzle structure which may be retrofitted into an existing gas turbine engine.

These and other objects of the invention will become apparent as a detailed description of representative embodiments proceeds.

SUMMARY OF THE INVENTION

In accordance with the foregoing principles and objects of the invention, a thrust vectoring and reversing exhaust nozzle structure for a gas turbine engine is described which comprises a rotatable flap mounted within the exhaust duct of the engine, and being rotatable about an axis of rotation extending transverse of the exhaust duct and substantially central of the flap, control means for rotating the flap between an open position allowing substantially unrestricted exhaust flow through the nozzle and a closed position substantially closing the exhaust duct, and a cascade of rotatable vanes in the engine housing structure operatively interconnected with the flap for rotation to an open position in response to rotation of the flap to the closed position.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
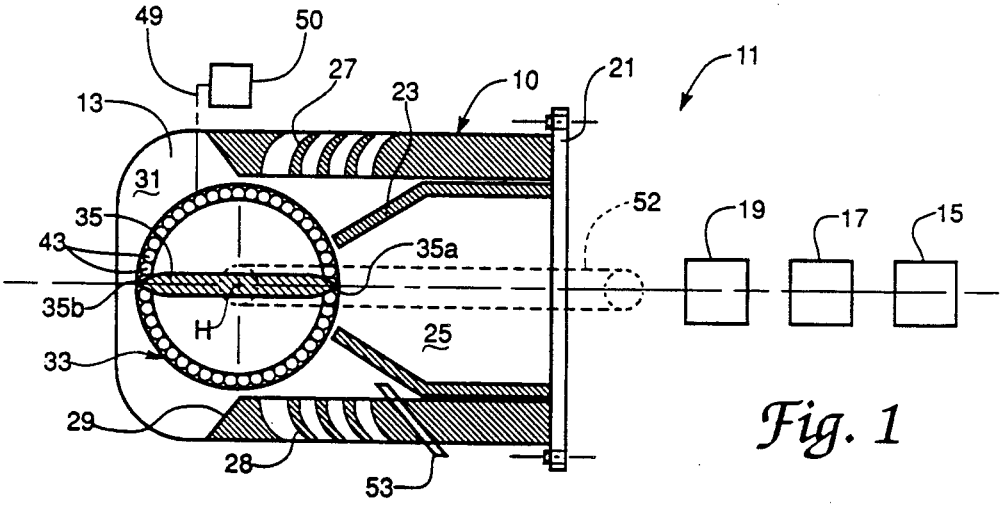
FIG. 1 is a view in axial section of the exhaust end of a gas turbine engine showing an embodiment of the nozzle structure according to the invention.
Figure 2:
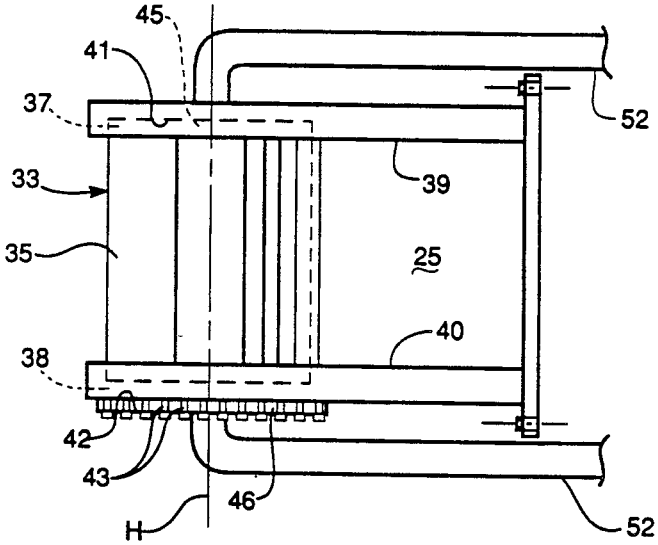
FIG. 2 is a top view of the FIG. 1 nozzle structure.

Referring now to the drawings, FIG. 1 is a side view in axial section of the exhaust end 10 of a gas turbine engine 11 showing a first representative embodiment of the nozzle structure 13 of the invention. FIG. 2 is a top view in axial section of the FIG. 1 nozzle structure. Engine 11 may comprise conventional structure defining compressor region 15, combustor 17 and turbine 19. The structure of engine 11 may terminate at nozzle interface 21 in the unconventional nozzle structure 13 including conventional convergent wall structure 23 defining exhaust duct 25, rotatable thrust reversing cascades (vanes) 27,28, and divergent wall structure 29 defining nozzle discharge region 31. One embodiment of nozzle structure 13 of the invention may be defined by the spool 33 structure depicted in FIGS. 1,2. Spool 33 comprises a substantially rigid and flat vectoring flap 35 mounted transverse of exhaust duct 25 between two movable side elements 37,38 rotatably mounted in side walls 39,40 defining duct 25. Bearing races 41,42 defined in sidewalls 39,40 receive conventional (roller) bearings 43 and bearing races 45,46 on each periphery of side elements 37,38.

Vectoring flap 35 is most preferably generally flat in structure and may assume any appropriate cross-sectional shape, such as the aerodynamic cross section suggested in FIG. 1, as would occur to one skilled in the appropriate art, the details of which shape are not considered limiting of the invention. Flap 35 is attached at corresponding ends thereof to side elements 37,38 for rotation therewith about a substantially horizontal axis H. Axis H is defined along the length of flap 35 substantially central thereof between leading edge 35*a* and trailing edge 35*b*. Flap 35 may preferably be configured and mounted such that axis H is central of flap 35 between edges 35*a*,35*b*, although for certain purposes occurring to the skilled artisan, flap 35 may be mounted for rotation about a rotation axis somewhat off center.

Figure 3A:
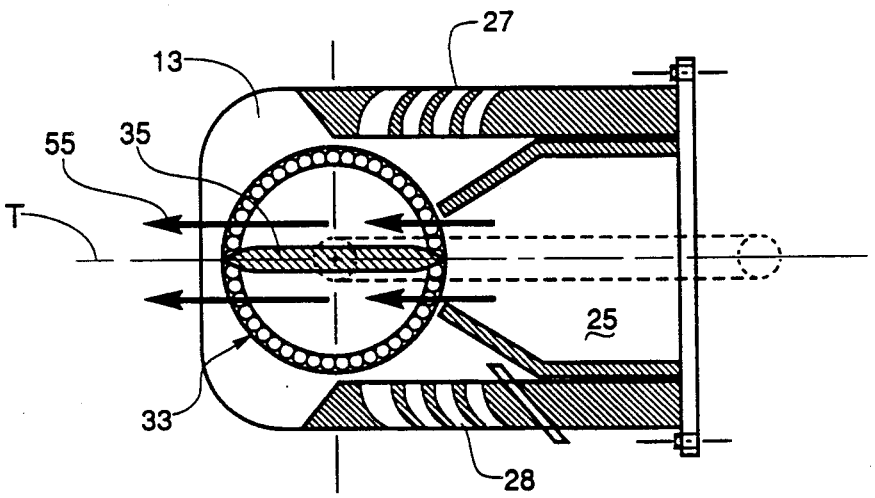
FIGS. 3*a–c* illustrate non-vectoring, vectoring and reversing positions of the nozzle according to the invention.
Figure 3B:
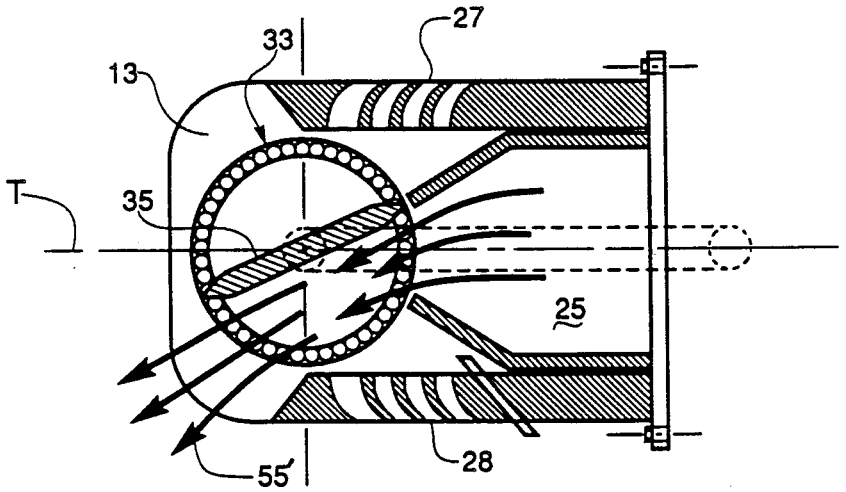
Figure 3C:
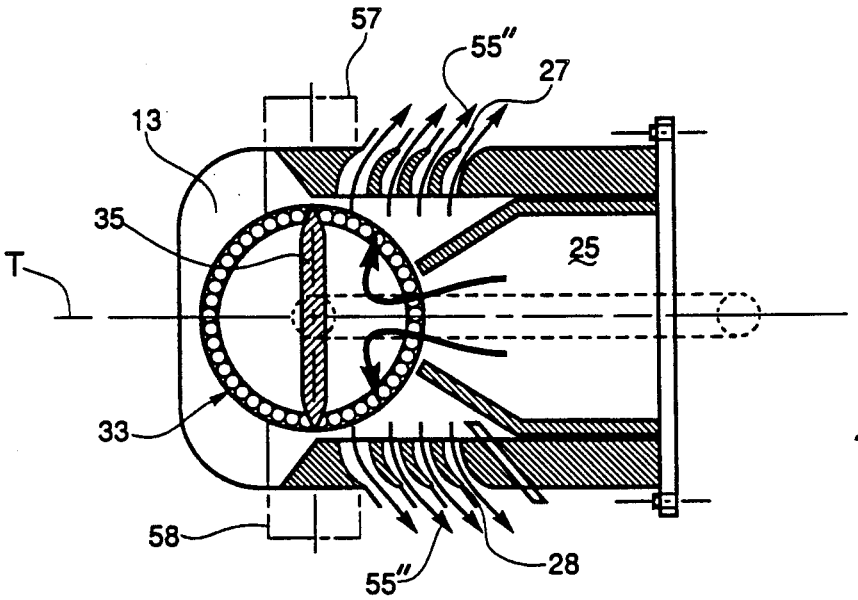

Spool assembly 33 structure of the invention is connected through suitable linkage 49 to motor means 50 for selectively rotating vectoring flap 35 about axis H in accordance with the principal function of the invention as described more fully below in relation to FIG. 3. Vectoring flap 35 may be cooled in any suitable conventional fashion such as the central cooling arrangement suggested in FIGS. 1,2 comprising cooling tubes 52 for conducting engine by-pass air from compressor region 15. Accordingly, the internal structure of flap 35 may be configured to define passageways therethrough for conducting air for cooling purposes. Means (not shown) defining a conduit through side elements 37,38 along axis H (FIG. 1) or through hubs 63,64 (FIG. 4) may be included to conduct coolant air through flap 35 or 61. One or more ejector nozzles 53 may be disposed as suggested in FIG. 1 for forming a pressure boundary equal to that of the exit pressure for optimizing gaseous flow through exhaust duct 25.

Referring now to FIGS. *3a–c*, shown therein are three representative positions of vectoring flap 35 illustrating the operation of the FIG. 1 embodiment in providing vectoring or thrust reversal for engine 11. In FIG. *3a*, vectoring flap 35 is in the neutral horizontal, non-vectoring position whereat rearward exhaust flow 55 along thrust axis T of engine 11 is undisturbed. In FIG. *3b*, vectoring flap 35 has been rotated to an intermediate position whereat exhaust flow 55' is directed rearwardly and at an angle to thrust axis T, whereby some directional control of the vehicle powered by engine 11 may be achieved. In FIG. *3c*, it is noted that linkage means 57,58 interconnecting vectoring flap 35 and thrust reverser cascades 27,28 allow for reversal of exhaust flow 55'' when vectoring flap 35 is rotated to a position substantially blocking exhaust duct 25. As vectoring flap 35 closes to the position shown in FIG. *3c*, thrust reversing cascades 27,28 open to allow exhaust flow 55'' to discharge outwardly and forwardly as suggested by the flow lines in FIG. *3c*.

Figure 4:
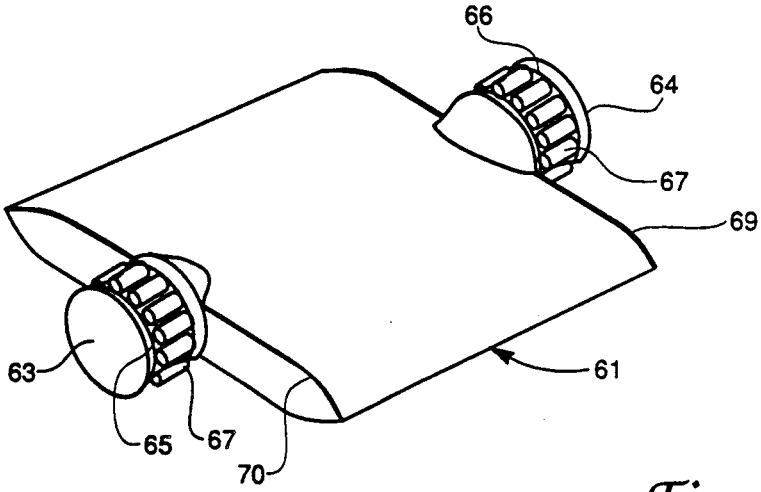
FIG. 4 is a perspective view of an alternate vectoring flap structure of the invention.

Referring now to FIG. 4, shown therein is an alternative vectoring flap 61 configuration of the invention. As seen in FIG. 4, vectoring flap 61 may include on either end thereof hubs 63,64 defining bearing races 65,66 for receiving bearings 67 and for journalization into side walls 39,40 defining exhaust duct 25. Vectoring flap 61 may ordinarily require seals 69,70 on either side in order to provide an adequate seal at the sidewalls of the nozzle when vectoring flap 61 is in the thrust reversal position.

An advantage of the invention herein which is not readily apparent from the foregoing description is that the rotatable flap structure claimed herein may, with routine engineering and minimal structural modifications, be integrated with and retrofitted into the exhaust nozzle structure of an existing gas turbine engine.

The invention therefore provides an improved thrust vectoring and reversing nozzle structure for a gas turbine engine. It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A thrust vectoring and reversing nozzle structure for a gas turbine engine, comprising:

(a) a housing structure defining an exhaust duct and nozzle discharge region of a gas turbine engine;

(b) a rotatable flap mounted within said exhaust duct;

(c) means on said housing structure for mounting said flap for rotation about an axis of rotation extending transverse of said exhaust duct and substantially central of said flap;

(d) means for controllably rotating said flap between an open position whereat exhaust flow through said nozzle discharge region is substantially unrestricted and a closed position whereat said exhaust duct is substantially closed;

(e) a cascade of rotatable vanes in said housing structure, said vanes being rotatable between an open position and a closed position; and (f) means interconnecting said flap and said cascade for selectively rotating said vanes to said open position thereof in response to rotation of said flap to said closed position thereof.

2. The nozzle structure of claim 1 wherein said means on said housing structure for mounting said flap for rotation about said axis includes a pair of rotatable plates attached to corresponding ends of said flap, each of said plates including a peripheral bearing race, and a plurality of bearings disposed within said peripheral bearing race within said housing structure.

3. In an exhaust nozzle for a gas turbine engine, said exhaust nozzle including a wall structure defining an exhaust duct and nozzle discharge region, an improvement comprising:

(a) a rotatable flap;

(b) means for mounting said flap for rotation about an axis of rotation extending transverse of said exhaust duct and substantially central of said flap;

(c) means for controllably rotating said flap between an open position whereat exhaust flow through said nozzle discharge region is substantially unrestricted and a closed position whereat said exhaust duct is substantially closed;

(d) a cascade of rotatable vanes in said housing structure, said vanes being rotatable between an open position and a closed position; and (e) means interconnecting said flap and said cascade for selectively rotating said vanes to said open position thereof in response to rotation of said flap to said closed position thereof.

* * * * *